R. S. GANS.
LOADING INDICATOR FOR VEHICLES.
APPLICATION FILED AUG. 14, 1919.
1,343,556. Patented June 15, 1920.
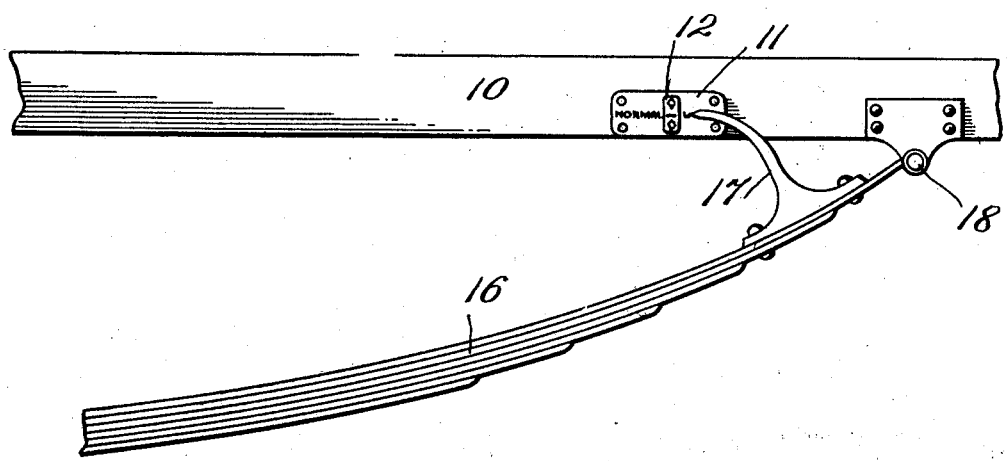
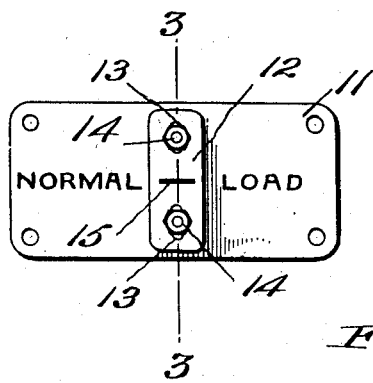
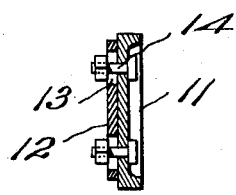
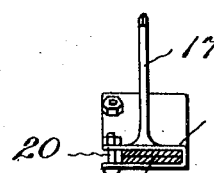
Robert S. Gans
Inventor
By his Attorney H. S. MacKay

UNITED STATES PATENT OFFICE.

ROBERT S. GANS, OF NEW YORK, N. Y.

LOADING-INDICATOR FOR VEHICLES.

1,343,556.   Specification of Letters Patent.   Patented June 15, 1920.

Application filed August 14, 1919. Serial No. 317,421.

*To all whom it may concern:*

Be it known that I, ROBERT S. GANS, a citizen of the United States, residing at New York, in the county and State of New York, have invented certain new and useful Improvements in Loading-Indicators for Vehicles; and I do hereby declare the following to be a full, clear, and exact description of the invention, such as will enable others skilled in the art to which it appertains to make and use the same.

My present invention relates to a simple, and inexpensive apparatus for indicating the degree of loading of a vehicle of any kind, and particularly of trucks, whether motor driven or otherwise. My improvement is particularly adapted for ready application to trucks and other vehicles by the means of simple tools and without requiring any special mechanical skill. The device is of such a nature that it cannot easily get out of order and requires only the most ordinary intelligence in the person using it or putting it in place upon a vehicle.

Where trucks are used to carry miscellaneous loads, loading by guess work is sure to involve waste. If a truck be underloaded its use involves a waste of time with consequent loss of profit. If it be overloaded there is undue wear and tear and a certain danger of disaster. It is therefore desirable to provide means whereby the driver or truckman may be able easily to ascertain when the proper load has been placed upon his vehicle, so that he may avoid either underloading or overloading the same.

Various plans have been suggested for this purpose, and it is the principal object of the present invention to provide means for carrying out the above named ends which shall be cheaper, simpler, and less liable to get out of order than the devices hitherto proposed.

My invention is illustrated in the accompanying drawing, wherein Figure 1 is a side elevation of the same, Fig. 2 is a plan view of the indicator plate, Fig. 3 is a transverse sectional view of said plate taken on the line 3—3 in Fig. 2, and Fig. 4 is a side view showing a modified form of attachment for the pointer.

It is clear that the more heavily a vehicle is loaded the more the supporting springs will be flattened, or in other words, the smaller will be the angle between the upwardly curved end of a given spring and the side bar of the vehicle chassis or frame. My invention depends upon the use of means for directly indicating the size of this angle, so that the approximate degree of load may be observed at a glance.

The simplest, and at the same time a perfectly satisfactory means for this purpose is shown in the drawing. At 10 is shown one of the side bars of an automobile chassis, or any appropriate part of the vehicle which, above the springs, may be used. To such a part I fix the indicator plate, which is preferably made in adjustable form as follows.

The base plate 11 is bolted or otherwise fixed to the beam or side bar 10, and upon the outer face of this base plate is arranged the movable gage plate 12 having vertical slots 13, through which the bolts 14 extend. By means of these bolts and slots the adjustable gage plate may be given any appropriate adjustment whereby the gage line 15, for indicating normal load, may be brought to the proper level.

Fixed to one of the vehicle-supporting springs 16 is a pointer 17 whose extremity is preferably directed away from the point of attachment 18 of the spring 16, and toward the vertical plane through the corresponding axle. As spring 16 flattens, the point of attachment of pointer 17 thereto may be considered as describing an arc about the point 18, and when the pointed end of pointer 17 inclines away from the attachment point 18 the angular movement of the base of the pointer gives a greater vertical displacement to the end of the pointer than would be the case if the pointer rose vertically from the spring. A similar effect would be observed if the pointer were inclined in the opposite direction far enough to extend beyond the attachment point 18. In either case the pointer is so inclined that its end points away from the attachment point 18. Accordingly, the arrangement noted increases the displacement of the pointer in proportion to the angular changes in the spring due to change of load. The tip of this pointer 17 plays in front of the gage plate 12, and the line 15 is so adjusted that said tip points to this line when a normal load is had, and points above or below it, according as there is an overload or an underload.

In the form shown in Fig. 1, the pointer is bolted or riveted to the top leaf of the spring, but I prefer the arrangement shown in Fig. 4, wherein the pointer 17 is fixed to a base 19 adapted to be slipped over the spring and secured in place by bolts 20 which do not pass through the spring. Any other means for temporary attachment of the pointer to the spring may be used without departing from the invention.

It will be seen that the apparatus above set forth affords means for obtaining a sufficiently close approximation to the degree of loading of a vehicle, which means are of the simplest and cheapest character, not easily put out of order, and capable of ready application by simple tools to any vehicle.

Various changes may be made in this device without departing from my invention, and I do not limit myself to the details herein shown and described.

What I claim is—

1. In a spring-supported vehicle, the combination of a vehicle frame, leaf springs supporting the same, fastened at their ends to the vehicle frame, a pointer fixed to one of said springs and indicating means on the vehicle frame adapted to coöperate with said pointer to indicate the extent of loading of the vehicle in proportion to the extent of flattening of said spring.

2. In a spring-supported vehicle, the combination of a vehicle frame, leaf springs supporting the same, fastened at their ends to the vehicle frame, a pointer having a base portion adapted to be positioned on one of said springs and removably secured thereto, and indicating means on the vehicle frame adapted to coöperate with the tip of said pointer to indicate the extent of loading of the vehicle in proportion to the extent of flattening of said spring.

3. In a spring-supported vehicle, the combination of a vehicle frame, leaf springs supporting the same, fastened at their ends to the vehicle frame, a pointer fixed to one of said springs near one end thereof and so inclined as to point away from the point of attachment of the spring to the vehicle frame, and indicating means on the vehicle frame adapted to coöperate with said pointer to indicate the extent of loading of the vehicle.

4. In a spring-supported vehicle, the combination of a vehicle frame, leaf springs supporting the same, fastened at their ends to the vehicle frame, a pointer fixed to one of said springs and indicating means on the vehicle frame adapted to coöperate with said pointer to indicate the extent of loading of the vehicle, said indicating means comprising a base plate secured to said vehicle frame and a marked gage plate adjustably attached to said base plate.

In testimony whereof, I affix my signature.

ROBERT S. GANS.